United States Patent

Bianchi et al.

Patent Number: 5,403,170
Date of Patent: Apr. 4, 1995

[54] COMPRESSOR SECTION IN AN EASILY ASSEMBLED MOTOR-COMPRESSOR UNIT

[75] Inventors: Vittorio Bianchi, Ferrera Di Varese; Giuseppe Maironi, Castronno, both of Italy

[73] Assignee: Whirlpool Europe B.V., Veldhoven, Netherlands

[21] Appl. No.: 162,417

[22] Filed: Dec. 3, 1993

[30] Foreign Application Priority Data

Dec. 22, 1992 [IT] Italy .................. MI92A2923

[51] Int. Cl.6 ................... F04B 17/00; F16J 1/14
[52] U.S. Cl. ....................... 417/437; 92/187; 417/902
[58] Field of Search ............ 417/902, 410 R; 92/187, 92/82, 129; 403/315, 316, 319, 335; 74/44

[56] References Cited

U.S. PATENT DOCUMENTS

| 312,495 | 2/1885 | Nash | 92/187 |
|---|---|---|---|
| 648,153 | 4/1900 | Serve | 92/82 |
| 1,294,538 | 2/1919 | Rose | 92/187 |
| 1,332,760 | 3/1920 | Saitta | 92/187 |
| 1,557,818 | 10/1925 | Elsas | 92/187 |
| 2,899,248 | 5/1959 | Mercier | 92/82 |
| 2,971,802 | 2/1961 | Kennemer | 92/82 |
| 4,291,552 | 9/1981 | Orain | 403/335 |
| 4,913,001 | 4/1990 | Watanabe et al. | 74/579 |

FOREIGN PATENT DOCUMENTS

| 2330923 | 6/1977 | France. | |
| 299688 | 3/1971 | U.S.S.R. | 92/187 |

Primary Examiner—Richard A. Bertsch
Assistant Examiner—Peter Korytnyk
Attorney, Agent, or Firm—Thomas J. Roth

[57] ABSTRACT

A preferably hermetic motor-compressor unit comprises a usual drive shaft operated by a known electric motor and acting on a compressor section (1) for a fluid, for example a refrigerant fluid, comprising a piston (3) associated with a connecting rod (2) operated by the said shaft, said piston (3) moving within the bore (23) of a corresponding cylinder (4) in which it compresses said fluid. With the connecting rod (2) there are associated means (11) arranged to engage with counter-means (13) associated with the piston (3) so as to connect this latter to the connecting rod (2), retention means (20) being provided to maintain the engagement between said means and counter-means.

7 Claims, 2 Drawing Sheets

COMPRESSOR SECTION IN AN EASILY ASSEMBLED MOTOR-COMPRESSOR UNIT

BACKGROUND OF THE INVENTION

This invention relates to a preferably hermetic motor-compressor unit of the type comprising a usual drive shaft operated by a known electric motor and acting on a compressor section for a fluid, for example a refrigerant fluid, comprising a piston associated with a connecting rod operated by the aforesaid shaft, said piston moving within the bore of a corresponding cylinder in which it compresses said fluid.

In a motor-compressor unit of the aforesaid type the connecting rod has to be connected to the compressor section. This means that known machining work has to be carried out on the piston, resulting in considerable construction time and cost for this section, which are reflected in the overall manufacturing time and cost of the motor-compressor unit.

In addition, in hermetic motor-compressor units the pistons of the compressor sections are not provided with piston rings for reasons related to the section construction cost, noise and the power dissipated by friction, in that the cost, noise and power dissipation all increase.

SUMMARY OF THE INVENTION

An object of the invention is to provide a motor-compressor unit which is of simple construction and low production cost. A further object of the invention is to provide a motor-compressor unit in which the compressor section is of more simple construction than known sections, and is of lower cost than these latter.

A further object is to provide a motor-compressor unit in which the compressor section is of high operating efficiency and generates very low noise, these advantages being achieved by low-cost, simple and rapidly effected modifications to said section. These and further objects which will be apparent to the expert of the art on reading the ensuing description are attained by a motor-compressor unit as described in the characterising part of the independent claim.

BRIEF DESCRIPTION OF THE DRAWINGS

The present invention will be more apparent from the accompanying drawing, which is provided by way of non-limiting example and in which.

DESCRIPTION OF THE PREFERRED EMBODIMENT

Figure 2A:
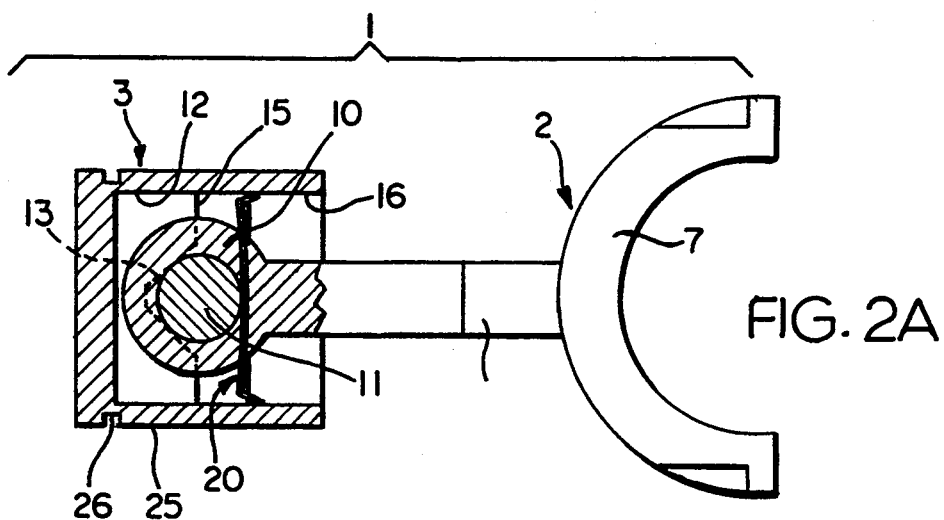
FIG. 2A is a longitudinal sectional view of that part of the compressor section shown in FIG. 1, but in the assembled state.

With reference to said figures, a motor-compressor unit, for example of hermetic type for use in a refrigerator, freezer or the like, comprises a section 1 for compressing a refrigerant fluid of known type. The section 1 is indicated for simplicity as a compressor section and comprises a connecting rod 2, a piston 3 and a cylinder 4, with one end 5 of which there is associated a usual valve plate 6.

The connecting rod 2 comprises an end 7 associated in known manner with a usual rotating shaft driven by a known electric motor (both not shown), an arm 8 extending from said end and terminating in an end 9 comprising an eyelet 10 through which a pin 11 is arranged.

Figure 1:
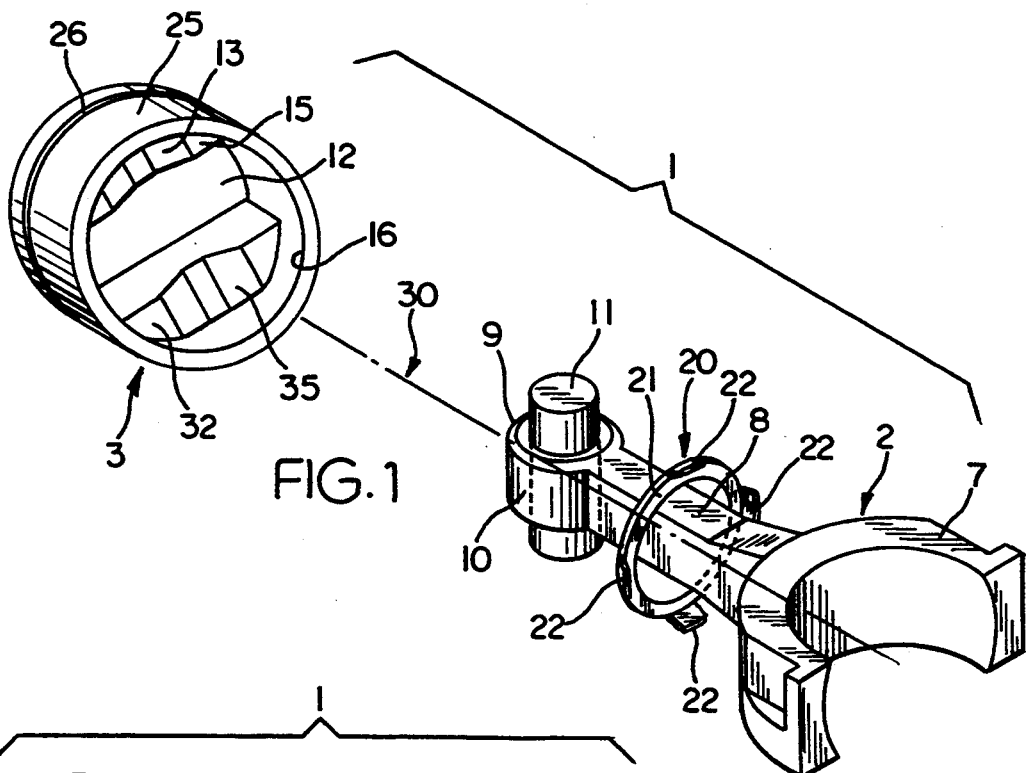
FIG. 1 is an exploded view of a part of the compressor section of the motor-compressor unit according to the invention.
Figure 2B:
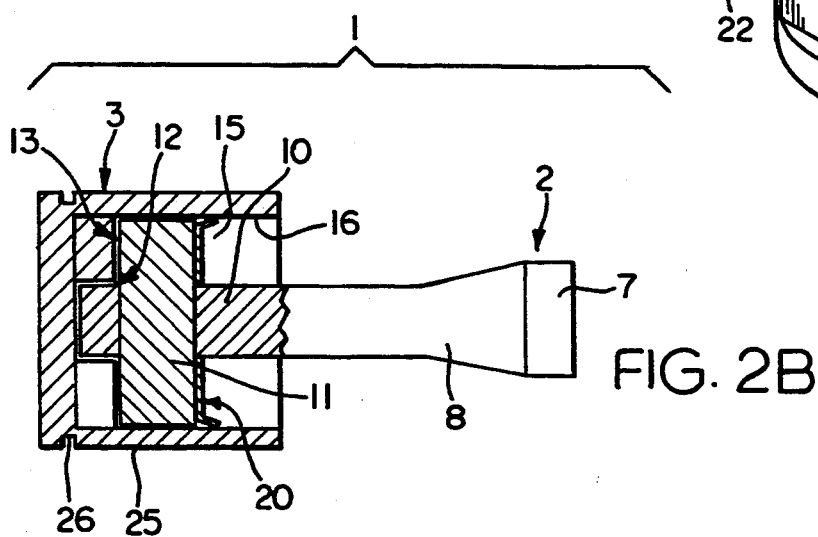
FIG. 2B is a longitudinal sectional view of that part of the compressor section shown in FIG. 1, rotated 90 degress about axis 30 from the sectional view of FIG. 2A.

The piston 3 is cylindrically shaped, with a circumferential wall 16, and a central longitudinal axis 30, as shown in FIG. 1. The piston is open on one end, creating a depressed part 15 inside the piston. A pair of recesses 12 and 13 are formed in the depressed part 15. Shoulder walls 32 and 33, shown in FIG. 1, traverse the interior of the piston inside wall 16, forming recess 12 which is oriented perpendicular to axis 30. Notches 35 and 36 cut into shoulder walls 32 and 33, respectively, form recess 13, which is oriented perpendicular to both axis 30 and recess 12.

In order to improve and ensure the connection an elastic ring 20 is associated with the connecting rod 2, and after inserting the pin 11 into the respective recess 13 is able to cooperate with said pin and with the wall 16 of the piston 2.

More specifically, the ring 20 comprises a substantially flat annular part 21 from which portions 22 project radially outwards from the ring in a direction preferably inclined to the annular part, said portions defining a sort of flared interrupted rim, the wall of which (defined by said portions) lies on the lateral wall of a cone with its vertex facing the piston 3.

The piston is arranged to slide within the usual bore 23 of the cylinder 4, which is closed at its end 5 by the plate 6. The refrigerant fluid reaches this bore in known manner and is compressed by the piston 3, which moves longitudinally within the bore 23 driven by the connecting rod associated with the drive shaft.

Figure 3:
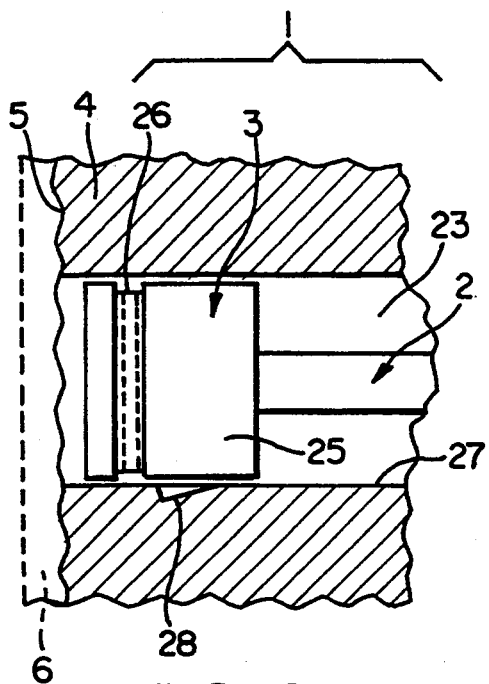
FIGS. 3, 4 and 5 show a longitudinal sectional view of the compressor section of the motor-compressor unit according to the invention, in different stages of use.
Figure 4:
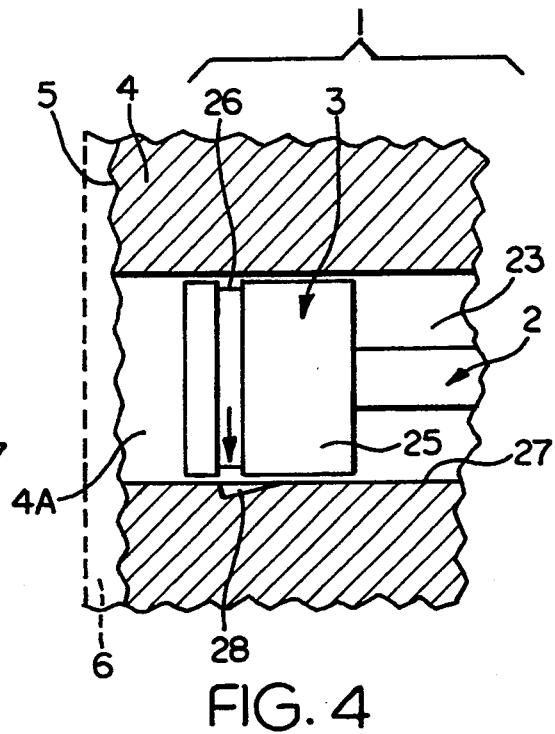
Figure 5:
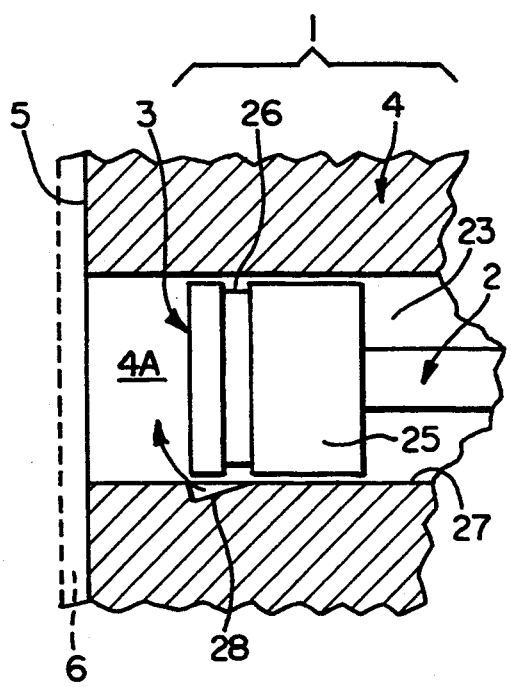
Figure 6:
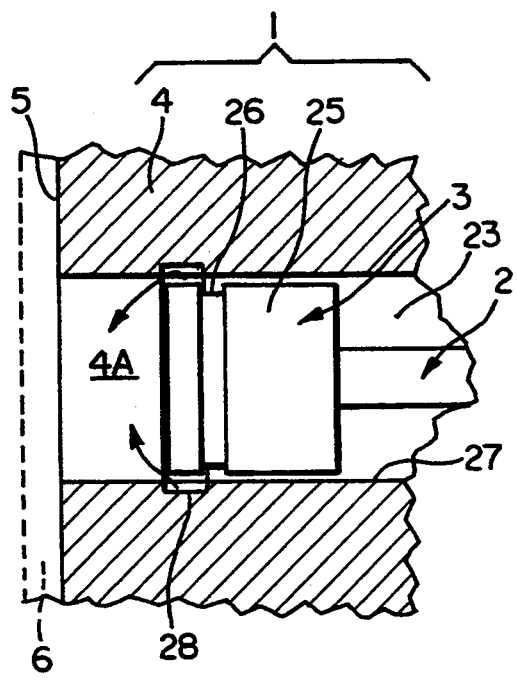
FIG. 6 is a longitudinal sectional view of a modification of the compressor section of FIGS. 3, 4 and 5.

The piston compr9ises an outer jacket 25 in which an annular recess 26 is provided. At least one recess 28 is also provided at least partly in the wall 27 of the bore 23, said recess either being limited to at least one portion of said wall (as in FIGS. 3,4 and 5) or being an annular recess (as in FIG. 6).

When the compressor is in use, during the fluid compression within the cylinder 4 the fluid which escapes from its compression chamber 4A penetrates into the annular recess 26 running along its jacket 25. During piston return, the gas which has collected in the recess 26 passes into the recess 28 in the wall 27 of the bore 23 of the cylinder 4 and collects therein. In this manner at least part of the fluid which escapes from the compression chamber is recovered by it passing into the chamber 4A when the piston moves towards its bottom dead centre, and is recompressed by the piston when this again moves towards its top dead centre. In this manner there is little or even no dispersion of the refrigerant fluid within the motor-compressor unit. The refrigerant fluid recovered via the recesses 26 and 28 in the piston 3 and cylinder 4 is prevented from dispersing by the opening (achieved in known manner) of the usual valves in the plate 6.

A particular embodiment of the invention has been described. Other embodiments are however possible falling within the scope of the present document.

What is claimed is:

1. A hermetic motor-compressor unit comprising a drive shaft operated by an electric motor and acting on a compressor section for a refrigerant fluid, said motor-compressor unit comprising a piston, and a connecting rod operated by said drive shaft, said piston moving within a cylinder in which it compresses said fluid, wherein the connecting rod includes a in engaged with a first recess in the piston, and retention means installed by interference fit in the piston to maintain the engagement between said pin and said first recess.

2. A motor-compressor unit as claimed in claim 1, wherein the pin is carried by a first end of the connecting rod, and the first recess is provided in a depressed part of the piston.

3. A motor-compressor unit as claimed in claim 2, wherein the first recess is provided in a depressed part of the piston from which a wall rises, and in said depressed part there is provided a second recess for cooperating with said first end of the connecting rod.

4. A motor-compressor unit as claimed in claim 3, further comprising an axis oriented in the axial direction of the piston, wherein said first recess is oriented perpendicular to said axis, and said second recess is positioned in the depressed part of the piston in a direction perpendicular to the first recess and said axis.

5. A motor-compressor unit as claimed in claim 1, wherein the piston further comprises at least one fluid collection recess for receiving any connecting rod fluid which leaks from the compression chamber of the cylinder during the compression stage of said piston in its movement within said cylinder, this and further comprising at least one fluid collection recess in said cylinder for collecting at least part of said fluid which passes into the recess in the piston.

6. A motor-compressor unit as claimed in claim 5, wherein the fluid collection recess in the piston is annular.

7. A motor-compressor unit as claimed in claim 5, wherein the fluid collection recess in the cylinder is annular.

* * * * *